(12) United States Patent
Vandervort et al.

(10) Patent No.: US 8,321,382 B2
(45) Date of Patent: Nov. 27, 2012

(54) VALIDATING AGGREGATE DOCUMENTS

(75) Inventors: David Russell Vandervort, Walworth, NY (US); Venkatesh Guru Rao, Arlington, VA (US); Jesse Silverstein, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 293 days.

(21) Appl. No.: 12/731,694

(22) Filed: Mar. 25, 2010

(65) Prior Publication Data

US 2011/0238632 A1 Sep. 29, 2011

(51) Int. Cl.
*G06F 17/30* (2006.01)
(52) U.S. Cl. ........................................ 707/687
(58) Field of Classification Search .............. 707/3, 692, 707/687; 713/178; 726/22
See application file for complete search history.

(56) References Cited

U.S. PATENT DOCUMENTS

| | | | |
|---|---|---|---|
| 6,049,812 A | 4/2000 | Bertram et al. | |
| 6,356,898 B2 | 3/2002 | Cohen et al. | |
| 6,377,983 B1 | 4/2002 | Cohen et al. | |
| 6,691,163 B1 | 2/2004 | Tufts | |
| 6,735,694 B1 * | 5/2004 | Berstis et al. | 713/178 |
| 6,877,137 B1 | 4/2005 | Rivette et al. | |
| 7,159,023 B2 | 1/2007 | Tufts | |
| 7,958,555 B1 * | 6/2011 | Chen et al. | 726/22 |
| 2002/0138486 A1 | 9/2002 | Rishel | |
| 2003/0105716 A1 * | 6/2003 | Sutton et al. | 705/50 |
| 2004/0237037 A1 | 11/2004 | Sweet et al. | |
| 2005/0076000 A1 | 4/2005 | Sweet et al. | |
| 2005/0188300 A1 | 8/2005 | Sweet et al. | |
| 2006/0085492 A1 | 4/2006 | Singh et al. | |
| 2007/0250480 A1 * | 10/2007 | Najork | 707/3 |
| 2010/0049760 A1 * | 2/2010 | Rousseau et al. | 707/692 |

FOREIGN PATENT DOCUMENTS

| | | |
|---|---|---|
| EP | 0957437 A2 | 11/1999 |
| WO | 99/12109 | 3/1999 |

OTHER PUBLICATIONS

European Search Report and Written Opinion, Jul. 6, 2010.
U.S. Appl. No. 12/408,397, "Trail-Based Data Content Discovery, Organization, and Processing," Venkatesh Guru Rao, filed Mar. 20, 2009.
U.S. Appl. No. 12/408,431, "Generating Formatted Documents Based on Collected Data Content," David Russell Vandervort, filed Mar. 20, 2009.
"Help: Introduction to Semantic MediaWiki", http://semantic-Mediawiki.org/wiki/Help:Introduction_to_Semantic_MediaWiki, 3 pages, Aug. 6, 2008.
Bush, Vannevar, "As We May Think," The Atlantic Online, www.theatlantic.com;doc/print/194507/bush, 12 pages, Jul. 1945.

(Continued)

*Primary Examiner* — Etienne Leroux
(74) *Attorney, Agent, or Firm* — Hoffmann & Baron, LLP (57) ABSTRACT

Embodiments described herein are directed to validating an aggregate document. An instance signature can be generated for a first instance of a data page retrieved for inclusion in the aggregate document and can be compared to a baseline signature associated with a second instance of the data page. A similarity value can be calculated in response to the comparison. The similarity value indicates a degree of similarity between the first instance and the second instance of the data page. Based on the similarity value it can be determined whether to delete or bypass the data page in the aggregate document.

20 Claims, 4 Drawing Sheets

OTHER PUBLICATIONS

OCLC News Releases, "OCLC's New Web Harvester Captures Web Content to Add to Digital Collections," http://www.oclc.org/news/releases/200829.htm, 2 pages, Jul. 29, 2008.

M. Dontcheva, S.M. Drucker, G. Wade, D. Salesin and M.F. Cohen, "Collecting and Organizing Web Content," Personal Information Managment—A SIGIR 2006 Workshop, pp. 44-47.

* cited by examiner

VALIDATING AGGREGATE DOCUMENTS

BACKGROUND

1. Technical Field

The presently disclosed embodiments are directed to validating aggregate documents in a computing environment.

2. Brief Discussion of Related Art

Networks, such as intranets and the Internet, give people access to vast amounts of networked documents from different sources. Networked documents, such as web pages, documents in a network repository, and the like, are often transient. These documents can change without warning or can disappear completely.

Recently, the notion of aggregate documents has been introduced, in which an aggregate document is generated using separate individual documents from different sources (e.g., source documents). One or more pages of the source documents can be included as an ordered sequence of data pages or sub-documents in the aggregate document. In a typical implementation, the aggregate document can be formed dynamically each time a user wishes to output the aggregate document to a display or printer based on references to the location of the actual source documents. In this implementation, the data pages of the aggregate document are typically retrieved from the source documents each time the aggregate document is dynamically generated.

When aggregate documents are generated by aggregating pages from these source documents, the aggregate documents can quickly become obsolete or even unrecoverable because of the changes to the individual underlying source documents, which are used to generate the aggregate document. As a result, aggregate documents can become difficult to manage as their constituent data pages or sub-documents are subject to unilateral change, deletion, and/or relocation. For example, source documents can be moved from their reference location, edited so their content is no longer relevant, deleted from the network, and the like.

When it is time to produce a compiled copy of an aggregate document based on, for example, locations of source documents referenced by the aggregate document, some of the data pages of the aggregate document can cease to exist, can no longer be at the reference location, or can simply be different from what was expected. This can result in an incomplete, erroneous, or otherwise undesirable instance of the aggregate document. For example, missing pages can produce error pages that break up the flow of aggregate document, or can even break the sequence so that nothing is produced or printed.

SUMMARY

According to aspects illustrated herein, there is provided a method for validating an aggregate document. The method includes generating an instance signature for a first instance of a data page retrieved for inclusion in the aggregate document and comparing the instance signature to a baseline signature associated with a second instance of the data page. The method also includes calculating a similarity value in response to the comparing and determining whether to delete or bypass the data page in the aggregate document based on the similarity value, wherein the similarity value indicates a degree of similarity between the first instance and the second instance of the data page.

According to other aspects illustrated herein, there is provided a non-transitory computer readable medium storing instructions executable by a computing system including at least one computing device. Execution of the instructions implements a method for validating an aggregate document that includes generating an instance signature for a first instance of a data page retrieved for inclusion in the aggregate document and comparing the instance signature to a baseline signature associated with a second instance of the data page. The method implemented upon execution of the instructions also includes calculating a similarity value in response to the comparing and determining whether to delete or bypass the data page in the aggregate document based on the similarity value, wherein the similarity value indicates a degree of similarity between the first instance and the second instance of the data page.

According to further aspects illustrated herein, there is provided a system for validating an aggregate document. The system includes a computer system having at least one computing device. The computing system is configured to generate an instance signature for a first instance of a data page retrieved for inclusion in the aggregate document and compare the instance signature to a baseline signature associated with a second instance of the data page. The computing system is further configured to calculate a similarity value in response to the comparing and determine whether to delete or bypass the data page in the aggregate document based on the similarity value. The similarity value indicates a degree of similarity between the first instance and the second instance of the data page.

DETAILED DESCRIPTION

Exemplary embodiments include a validation unit for validating aggregate documents. Embodiments of the validation unit can determine accessibility of data pages referenced by the aggregate document and can determine deviations in the content of the data pages compared to one or more instances of the data pages retrieved by the validation unit during a previous generation or regeneration of the aggregate document. The validation unit can delete and/or bypass data pages based on the accessibility of the data pages and/or changes to the data pages.

Exemplary embodiments of the validation unit address the difficulties of changing web (and other) documents by traversing a collection of data pages used to form an aggregate document and verifying that each data page is still retrievable and usable for compiling an instance of the aggregate document. If a referenced data page has disappeared, been relocated, or has otherwise changed, the aggregate document can be updated to reflect this. This permits an end user to continue to regenerate an aggregate document for output so that the user can read, print, transmit, and the like, the aggregate document, seamlessly, without being burdened by error pages, broken aggregation/print mechanisms in an aggregate document, a failure to generate or compile an instance of the aggregate document, and the like.

As used herein, an "aggregate document" refers to a composite computer document formed from two or more separate and distinct source computer documents. Computer documents that can be included in an aggregate document can include web pages, one or more pages of word processing documents (e.g., Microsoft Word documents), images, one or more pages of portable document format (PDF) documents, one or more sheets of spreadsheet documents (e.g., Microsoft Excel spreadsheets), one or more slides of presentation documents (e.g., Microsoft PowerPoint documents), electronic publication (ePub) files, and the like.

As used herein, a "data page" refers to a page from a document, such as a web page, a page from a word processing document, a page from a portable document file (PDF), and the like.

An example of an aggregate document can be a "content trail", which refers to one or more organized ordered sequences of data pages having user-assigned relationships to define at least one path, where "organize" refers to specifying, or otherwise forming one or more ordered sequences and an "ordered sequence" refers to a defined arrangement of the data pages as a partially ordered set, a totally-ordered set, a strict sequence, and the like.

A user can generate a content trail by organizing selected data pages into a desired, ordered sequence by forming relationships between the data pages to define a structure of the content trail, where a "relationship" refers to an association between two or more data pages generally defined by a user. Relationships between the selected data pages can be defined by the user to interconnect the data pages associated with the content trail. Relationship between two or more data pages can occur external to the data pages such that relationships are not inserted into, or defined within, the data pages. In this manner, relationships can define external connections between independent discrete data pages so that a connection between the data pages is not defined by hyperlinks within the data pages. A relationship may be arbitrarily or otherwise defined and may be explicit or implicit in nature. Data pages that have a relationship are referred to herein as being "interconnected." Data pages can be disconnected to remove a relationship and can be reconnected to redefined relationships between the data pages.

A content trail can include meta-data corresponding to the data pages and the relationships of the data pages to other data pages in the content trail, where "meta-data" is generally understood by those skilled in the art to refer to information about information. Examples of metadata that can be associated with references to data pages include a location of the data pages, labels, relationships between the data pages and other data pages, the referenced data pages itself, permission levels associated with nodes for various sorts of editing and sharing, copyright information for individual referenced pages, version information for dynamic pages, and the like.

An "underlying data structure" refers to a data file that maintains information, such as meta-data, concerning the data pages of an aggregate document. The underlying data structure can be an XML document, database schema, or other suitable data format. As the user develops the content trail, the underlying data structure is maintained, such that when a data page is inserted into the content trail, the underlying data structure is updated to include information concerning the data page. Likewise, when a relationship is defined by the user, the underlying data structure is updated to reflect the relationship. Therefore, the underlying data structure can include references to the data page, such as a location at which a data page can be retrieved, and the relationships between the data pages.

In some embodiments, the content trail can be represented as a visual diagram in the form of, for example, a directed graph, where the nodes, represented as circles or other shapes, reference the selected data pages and the edges, represented as lines with directional arrows extending between nodes, illustrate the relationships between the referenced data pages. The edges in the directed graph can represent a relationship between the nodes to impose a partial or total ordering on the data pages associated with the content trail. The edges can be created explicitly, or can be created to mirror naturally-occurring relationships of the data pages.

In some embodiments, a trail generator can be used to generate a data model of a content trail using data pages discovered by a user. The data pages can be collected without regard to an absence of an existing link structure between the data pages. The trail generator can allow a user to generate a content trail having one or more sequences of data pages arranged in a user defined order and having user-defined relationships between the data pages. For example, the trail generator can allow a user to organize selected data pages based on the user's preferences. In some embodiments, the data model can be generated and displayed as a directed graph including nodes as references to the data pages and edges as relationships between the nodes. An exemplary trail generator and content trails generated using the exemplary trail generator are described in more detail in co-pending U.S. patent application Ser. No. 12/408,397, entitled "Trail-Based Data Content Discovery, Organization, and Processing" and filed on Mar. 20, 2009, the disclosure of which is incorporated herein by reference in its entirety.

As used herein, a "website" refers to a set of web pages generally located on the same server with the same domain name and "web page" is a single page generally associate with a Uniform Resource Identifiers (URIs) address, such as a Uniform Resource Locator (URL) address. To move from first web page to second web page of a website, the first web page generally includes a hyperlink to the second web page embedded therein that must be selected by a user.

As used herein, a "web browser" or "browser" refers to a software application implemented using a computing device to access and navigate the Internet, Intranet, or other compilation of files generated in suitable mark-up languages.

As used herein, a "referenced location" refers to a source location associated with a data page. Referenced locations can be user-defined, pre-defined, or otherwise specified, and can include, for example, addressing schemes including Uniform Resource Locators (URLs), Uniform Resource Identifiers (URIs), extensible mark-up language (XML) path (XPath) addresses, sequential numbering and/or alphabetizing schemes, descriptive text identifiers, such as titles of the data pages, and the like.

As used herein, "retrieving" refers to locating, accessing, and reading data from a storage location.

As used herein, "instance", as in an instance of a data page, refers to a version, copy, or occurrence of an object or thing at a moment or point in time. For example, a data page retrieved a week ago can be an instance of the data page and the same data page retrieved today can be another instance of the data page.

As used herein, "signature" refers to a distinctive marker that can be used to identify an instance of a data page. A signature can be encoded content corresponding to an instance of a data page or a portion of an instance of the data page. A signature has the characteristics that when a particular document or set of text is repeatedly put through the same signature algorithm, the resulting signatures will be the same, but when a different document or set of text is put through the same signature algorithm, there is a very low probability that the signature will be identical. That is, identical documents or data pages have identical signatures if the same signature algorithm is used and documents that are not identical have different signatures.

As used herein, "instance signature" refers to a signature generated using a current instance of a data page that was retrieved for a validation process.

As used herein, "baseline signature" refers to a signature generated using an instance of a data page that was previously retrieved before a validation process. For example, a baseline signature can be generated from an instance of a data page retrieved for a prior implementation of the validation process, an instance of the data page retrieved during a previous formation of the aggregate document, and the like.

As used herein, an "identifier" refers to a unique sequence of characters or other glyphs for identifying or distinguishing objects or things from each other. For example, signatures can include one or more identifiers that can be used to compare the signatures to each other when determining a similarity between the signatures.

As used herein, "common identifier" refers to an identifier included in two or more signatures.

As used herein, "similarity" refers to having alike, identical, common, and/or matching parts between two or more objects or things, such as having instances of a data page with at least some common content or having a baseline signature and an instance signature of a data page having common identifiers.

As used herein, "degree of similarity" refers to a measure of how similar two or more objects or things, such as data pages or signatures, are to each other. A degree of similarity can be expressed, for example, as a percentage, where 100% similarity can indicate an exact or identical match between two or more objects and 0% similarity can indicate complete dissimilarity between two or more objects such that there is no match.

As used herein, "similarity value" refers to a numerical value that indicates a degree of similarity between two or more objects or things, such as data pages or signatures.

As used herein, "deletion threshold value" refers to a specified value for determining whether to delete a data page from an aggregate document based on a comparison with a similarity value, where "delete" refers to removing a data page from an aggregate document.

As used herein, "bypass threshold value" refers to a specified value for determining whether to bypass a data page in an aggregate document based on a comparison with a similarity value, where "bypass" refers to circumventing, skipping, or diverting passed a data page in an aggregate document so that the data page is omitted from the ordered sequence.

As used herein, "validating" refers to updating, maintaining, and/or repairing an aggregate document to produce a valid instance of the aggregate document.

As used herein, a "validation process" refers to a procedure for validating an aggregate document.

As used herein, a "validation unit" refers to a hardware and/or software implemented to perform the validation process.

As used herein, "calculating" refers to determining, ascertaining, or computing using mathematical methods.

As used herein, "user-defined" and "user-assigned" refer to specifications received from a user, such as, for example, a specification of a relationship between two data pages.

As used herein, a "computing device" can be a mainframe, personal computer (PC), laptop computer, workstation, handheld device, such as a PDA, or the like, that includes a processing unit and is configured to implement the trail generator or at least a portion of the trail generator.

A "repository" or "database" refers to a storage system in which information, such as content trail are stored. The information stored in the repository or database is accessible to one or more users, where "accessible" refers to the ability to retrieve information from the repository or database.

As used herein, a "path" refers to a contiguous sequence of data pages from a first data page to a last data page, where adjacent pages are connected based on a defined relationship. A path can diverge into two or more separate paths, where each path includes a sequence of data pages, and can converge into a single path, where two or more sequences of data pages join at a common data page.

Figure 1:
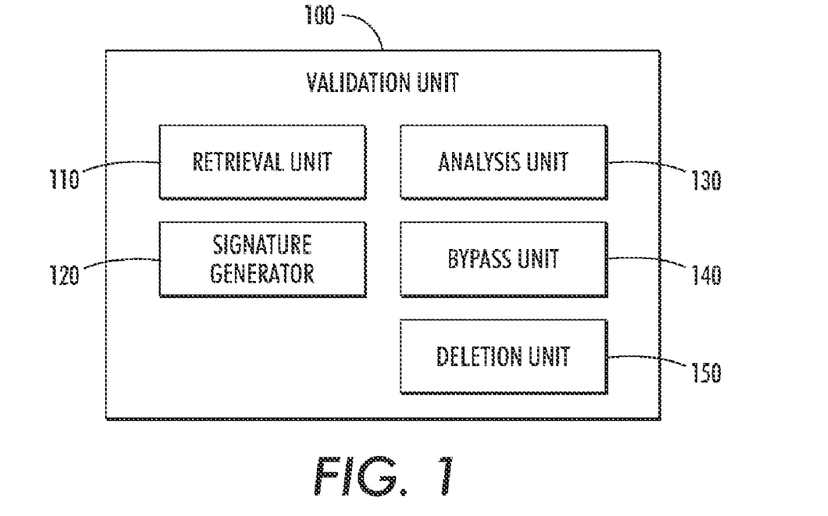
FIG. 1 depicts a block diagram of an exemplary aggregate document validation unit for validating, maintaining, updating, and/or repairing aggregate documents.

FIG. 1 depicts a block diagram of an aggregate document validation unit 100 (hereinafter "validation unit 100") that includes a retrieval unit 110, a signature generator 120, an analysis unit 130, a bypass unit 140, and a deletion unit 150. The validation unit 100 can be configured to perform a validation process for maintaining, updating, and/or repairing aggregate documents. The validation unit 100 can begin the validation process using an underlying structure of the aggregate document, which can contain referenced locations of data pages forming the aggregate document. The underlying structure of the aggregate document can be in the form of an aggregate document database, an XML file, or other suitable format. For example, the underlying structure can be a database including pointers to original source documents for each sub-document (e.g., data page) of an aggregate document. The validation unit 100 can check the state of the data pages referenced by the aggregate document metadata and can alter the resulting aggregate document such that as much of the aggregate document as possible can be regenerated to output the aggregate document without errors or inappropriate pages.

The validation process implemented by the validation unit 100 can validate data pages included in the aggregate documents, as well as, relationships between data pages establishing the ordered sequence of the data pages in the aggregate document. Missing data pages can be removed from the aggregate document by bypassing the data pages and/or deleting the data pages from the aggregate document. Data pages that have changed can be compared to a previous version of the data pages (if one exists) to determine the degree of change. Based on the degree of change, the validation unit 100 can temporarily bypass the data page, delete the data page, ignore the differences between the previous instance of the data page and the current instance of the data page, prompt users for a decision, and the like.

One result of the validation process implemented by the validation unit 100 can be an updated aggregate document that is free of blank pages, invalid pages (e.g., 404 errors in the case of web documents), out-of-date content, and the like. In some embodiments, if the content or ordering of data pages within the aggregate document differ from the previous version, the user can be made aware of the differences and can be prompted to accept the differences before outputting the aggregate document. The aggregate document can be output by, for example, displaying, printing, e-mailing, faxing, posting the aggregate document on a web site, and the like.

The retrieval unit 110 can attempt to retrieve data pages for the aggregate document using locations referenced by the aggregate document. As one example, the retrieval unit 110 can access a document repository, navigate to referenced location, and retrieve the source document from the referenced location. As another example, the retrieval unit 110 can access the Internet using, for example, a web browser, and can navigate to the referenced location, such as a Universal Resource Identifier (URI) (e.g., a Universal Resource Location (URL) address), and can retrieve (e.g., download) a web page located at the referenced location.

The retrieval unit 110 may be unable to retrieve a referenced data page because the referenced location at which the data page was located has changed since the last formation of the aggregate document or the data page may have been deleted. To ensure that there are no transient errors that would inhibit retrieval of the data page, the retrieval unit 110 can attempt to retrieve the data page N number of times. If the last attempt to retrieve the data page fails, the bypass unit 140 or the deletion unit 150 can be implemented to bypass or delete the reference data page, respectively.

In some embodiments, the retrieval unit 110 can attempt to retrieve a data page N number of times each time the validation process is performed. In some embodiments, the first time the retrieval unit fails to retrieve a data page (e.g., after N attempts), the validation unit 100 can delete the data page or bypass the data page. For embodiments where the data page is bypassed, the validation unit 100 can retry retrieving the data page the next time the validation process is performed for the aggregate document. In some embodiments, the validation unit 100 can continue to bypass an irretrievable data page indefinitely or can be configured to bypass an irretrievable data page X number of times, after which the validation unit 100 can delete the data page from the aggregate document.

The signature generator 120 can generate signatures for data pages referenced by the aggregate document. The signatures can include a series of identifiers, such as text strings or characters, which can be generated, for example, using a one-way encryption algorithm to generate a hexadecimal code, using hashing algorithm to generate hash codes, and the like. In some embodiments, the signatures can be generated based on a subset of possible character strings. For example, a signature can be generated using the first one hundred words of a data page, using the first 200 characters of the data page, using the first letter of some or all of the words in the data page, using the first letter after punctuation marks in the data page, using keywords in the data page, and the like. In some embodiments, a signature can be generated based on audio embedded in the data page, video embedded in the data page, images in the data page, and the like. Those skilled in the art will recognize that the signatures can be generated using one or more techniques.

The signature generator 120 can generate baseline signatures for the data pages referenced by the aggregate document. The baseline signatures can be generated using instances of data pages from a previous formation of the aggregate document. The baseline signatures represent expected signatures for instances of the data pages the next time the aggregate document is regenerated.

When the data pages of the aggregate document are being validated for regeneration of the aggregate document, the signature generator 120 can generate instance signatures for each data page that is retrieved during the regeneration. The instance signatures can be generated in an identical manner as the baseline signatures. Thus, each data page referenced in the aggregate document can be associated with two signatures: a baseline signature generated using a previous instance of the data page and an instance signature generated using a current instance of the data page.

The analysis unit 130 can compare the baseline signature to the instance signature of a data page to calculate a similarity value. For example, the identifiers in the signatures can be compared to identify common identifiers between the signatures, where the common identifiers indicate similarities between the signatures. The similarity value can indicate the extent to which the baseline signature and the instance signature are similar, and therefore, can be used to determine or estimate the extent to which the previous instance of the data page and the current instance of the data pages are similar. The similarity value can be calculated as a fraction or percentage of similarities between the baseline signature and the instance signature.

In some embodiments, the baseline and instance signatures can include a number of character strings, which can be compared by the analysis unit 130. The number of character strings that match between the signatures indicate similarities between the signatures. In some embodiments, a similarity value can be calculated by dividing the number of matches between the signatures by the number of character strings in the baseline signature or the instance signature. In some embodiments, a similarity value can be calculated taking the average of the quotient produced by dividing the number of matches by the number of character strings in the baseline signature and the quotient produced by dividing the number of matches between the signatures by the number of character strings in the instance signature. For example, a baseline signature for a data page can include two-thousand (2000), sixty-four bit (64-bit) strings and an instance signature of the data page can include two thousand one hundred (2100), sixty-four bit (64-bit) strings. When the signatures are compared, the analysis unit 130 can determine that one thousand eight hundred (1800) of the strings in the instance signature are identical to one thousand eight hundred (1800) of the strings of the baseline signature. The similarity value between the previous instance of the data page and the current instance of the data can be about 0.878 or 88%

$$\left(\frac{\frac{1800}{2000} + \frac{1800}{2100}}{2}\right).$$

Those skilled in the art will recognize that the exemplary similarity calculations described herein are illustrative and that other similarity calculation can be used by the analysis unit 130 when determining the similarity value.

The bypass unit 140 can update the aggregate document to bypass data pages that cannot be retrieved and/or have been modified beyond a bypass threshold value. When a data page is to be bypassed in an aggregate document, the bypass unit 140 updates the ordered sequence of the data pages in the aggregate document so that the data page to be bypassed is skipped and so that the data page preceding the data page to be bypassed and the data page immediately after the data page to be bypassed become adjacent consecutive data pages in the ordered sequence of data pages. For example, the bypass unit can update the underlying structure of the aggregate document to modify the relationship between the referenced data pages to reconnect the data pages that have not been bypassed in an updated ordered sequence. When a data page is bypassed, the bypass unit 140 can remember the position of the bypassed data page in the ordered sequence of data pages so that the bypassed data page can be reintroduced into the aggregate document at the position the bypassed data page previously occupied. In some embodiments, the bypass unit 140 can prompt the user before for authorization before bypassing a data page from the aggregate document.

The deletion unit 150 can update the aggregate document to delete data pages that cannot be retrieved and/or have been modified beyond a deletion threshold value. When a data page is to be deleted from an aggregate document, the deletion unit 150 updates the ordered sequence of the data pages in the aggregate document so that the data page to be deleted is skipped and so that the data page preceding the data page to be deleted and the data page immediately after the data page to be deleted become adjacent consecutive data pages in the ordered sequence of data pages. When a data page is deleted, the deletion unit 150 deletes the referenced location of the data page, as well as any other information associated with the data page, from the aggregate document by, for example, removing reference to the data page from the underlying structure of the data page. If user subsequently wishes to reinsert a deleted data page, the user can edit the aggregate document to include the deleted data page. In some embodiments, the deletion unit 150 can prompt the user before for authorization before deleting a data page from the aggregate document.

Figure 2:
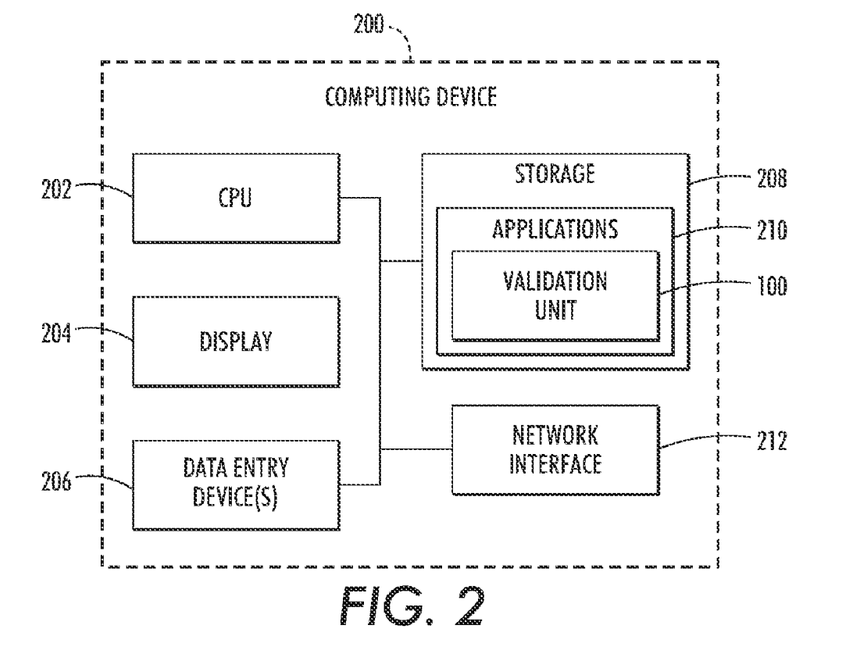
FIG. 2 depicts an exemplary computing device for implementing embodiments of the aggregate document validation unit.

FIG. 2 depicts an exemplary computing device 200 for validating aggregate documents using the validation unit 100. The computing device 200 can be a mainframe; personal computer (PC); laptop computer; workstation; handheld device, such as a PDA and/or smart phone; and the like. In the illustrated embodiment, the computing device 200 includes a central processing unit (CPU) 202 and can include a display device 204. The display device 204 enables the computing device 200 to communicate with an operator through a visual display. The computing device 200 can further include data entry device(s) 206, such as a keyboard, touch screen, microphone, and/or mouse. The computing device 200 can include storage 208 for storing data and instructions. The storage 208 can include computer readable medium technologies, such as a floppy drive, hard drive, compact disc, tape drive, Flash drive, optical drive, read only memory (ROM), random access memory (RAM), and the like.

Applications 210, such as the validation unit 100, can be resident in the storage 208. The applications 210 can include instructions for implementing the validation unit 100. The instructions can be implemented using, for example, C, C++, Java, JavaScript, Basic, Perl, Python, assembly language, machine code, and the like. The storage 208 can be local or remote to the computing device 200. The computing device 200 includes a network interface 212 for communicating with a network. The CPU 202 operates to run the applications 210 in storage 208 by executing instructions therein and storing data resulting from the performed instructions, which may be output via a display 204 or by other mechanisms known to those skilled in the art, such a print out from a printer.

Figure 3:
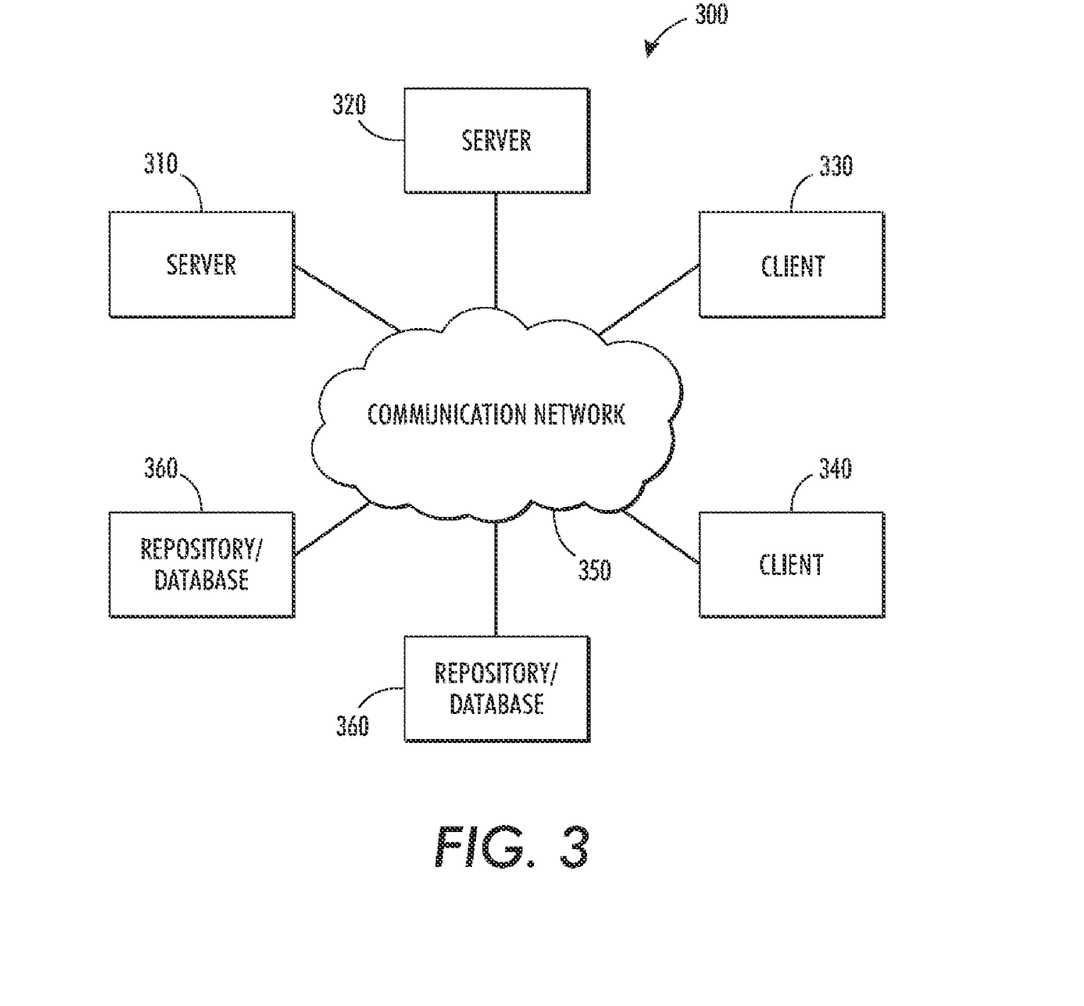
FIG. 3 depicts an exemplary computing system for implementing embodiments of the aggregate document validation unit in a networked environment.

FIG. 3 depicts an exemplary computing system 300 for implementing embodiments of the validation unit 100. The computing system 300 includes one or more servers 310 and 320 coupled to clients 330 and 340, via a communication network 350, which can be any network over which information can be transmitted between devices communicatively coupled to the network. The system 300 can also include repositories or database devices 360, which can be coupled to the servers 310/320 and clients 330/340 via the communications network 350. The servers 310/320, clients 330/340, and database devices 360 can be implemented using a computing device, such as a computing device implemented in a similar manner as the computing device 200 of FIG. 2. In some embodiments, the validation unit 100 can be implemented using a single computing device or can be implemented using multiple computing devices in a distributed manner.

The servers 310/320, clients 330/340, and/or databases 360 can store information, such as instances of the data pages; references to data pages; data page locations; user-defined relationships between the data pages; information associated with the data pages, references, and relationships; aggregate documents; baseline signatures; instance signatures, data page bypass information; and the like. In some embodiments, the validation unit 100 can be distributed among the servers 310/320, clients 330/340, and database devices 360 such that one or more components of the validation unit 100 and/or portion of one or more components of the validation unit 100 can be implemented by a different device (e.g. clients, servers, databases) in the communication network 350. For example, the retrieval unit 110 can be resident on the client 330, the signature generator 120 can be resident on the server 310, the analysis unit 130, bypass unit 140, and deletion unit 150 can be resident on the server 320. For embodiments where at least a portion of the retrieval unit 110 is resident on the client 330, the at least a portion of the retrieval unit 110 can be implemented as part of, for example, a web browser or mobile phone widget.

Figure 4:
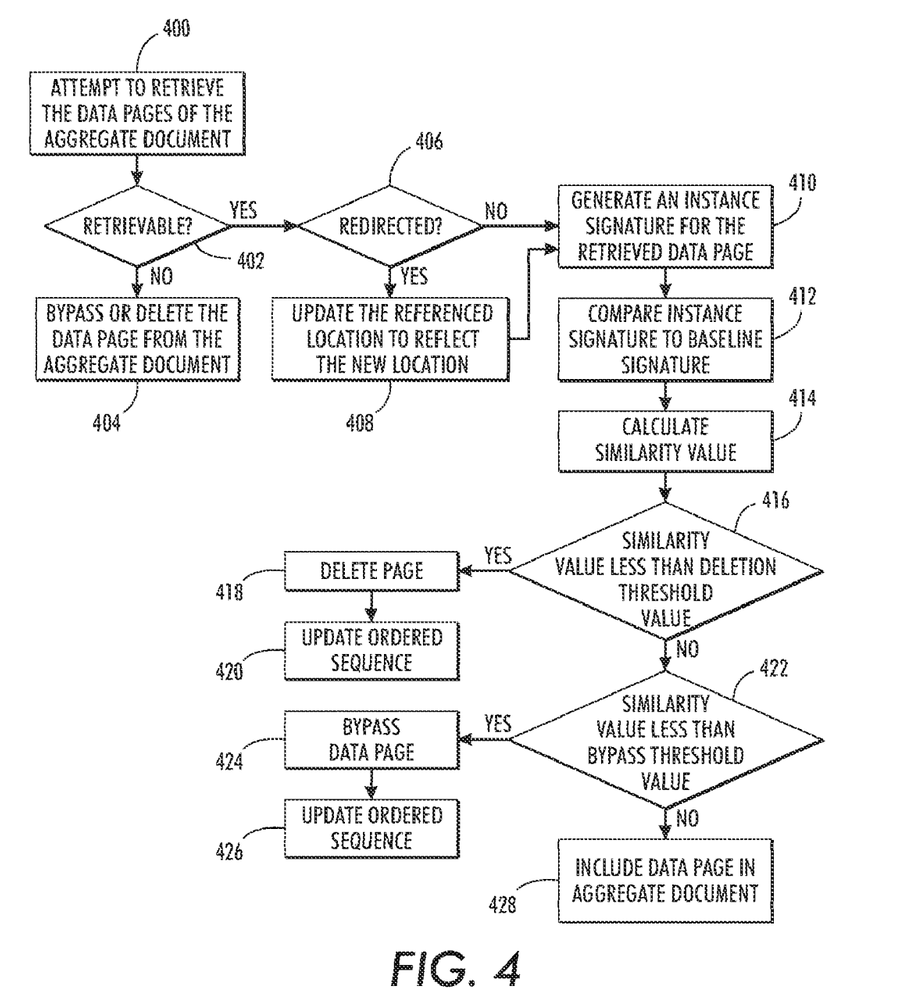
FIG. 4 is a flowchart illustrating a process of validating an aggregate document.

FIG. 4 is a flowchart illustrating a process of validating an aggregate document. The process can be performed in the same order for each of the data pages in the aggregate document. In some embodiments, the order in which the data pages are processed is irrelevant, as long as each of the data pages are processed by the validation unit. When an aggregate document is being compiled for output, the validation unit can attempt to retrieve the data pages of the aggregate document from the underlying individual distinct source documents (400). This allows the validation unit to verify that the data pages of the aggregate document are still available and accessible at the referenced location. If the source document cannot be retrieved (402), the validation unit can bypass or delete the data page associated with the source document from the aggregate document (404).

If the data page can be retrieved (402), but the location from which the data page can be retrieved has changed such that the validation unit is redirected to another location (406), the validation unit updates the referenced location to reflect the new location (408) and generates an instance signature for the retrieved data page (410). Source documents, and web pages in particular, can often be moved to new domains or locations. For example, the location of a web page can move to a new location or domain within the original website and a redirect link (http response code 301) can be provided at the original location to direct requests for the web page to the new location at which the web page can be retrieved. In order to avoid outputting a "page permanently moved" or a similar message for a data page in an aggregate document, the referenced location in the aggregate document for the data page that has been redirected can be automatically updated to the new location. In some embodiments, the validation unit can prompt the user to choose whether to update the referenced location or to delete the data page when the validation unit determines that the referenced location of the data page has changed.

If the source document can be retrieved without being redirected (406), the validation unit generates an instance signature for the retrieved data page of the source document (410). Each retrieved data page can have a baseline signature generated from a previously retrieved instance of the data page, such as, for example, from a previous implementation of the validation process. If baseline signature does not exist for a data page, the validation unit can generate and store a baseline signature for the data page for future use in the validation process.

The generated instance signature is compared to the baseline signature associated with the data page (412) and a similarity value between the generated instance signature and the baseline signature is calculated (414). The similarity value can be calculated based on the extent to which the baseline and instance signatures match. For example, when the instance signature and the baseline signature are composed of identifiers represented as text strings, the number of text strings the signatures have in common (i.e. common identifiers between the signatures) can be used to calculate a numerical similarity value so that, for example, if the signatures have fifty percent (50%) of the text strings in common then the similarity can be equal to fifty percent (50%) (i.e., the similarity value can be calculated by dividing the number of common identifiers by the total number of identifiers in the baseline signature). In some embodiments, the validation unit finds keywords in the instance signature and determines the level of similarity by comparing the keywords in the instance signature to keywords in the baseline signature. In this manner, the validation unit can go beyond determining whether the data page is still accessible to determine how much the data page has changed from a previous instance of the data page and whether the data page is still suitable for use in the aggregate document.

Subsequently, the calculated similarity value is compared to a deletion threshold value. If the similarity value is less than the deletion threshold value (416), the data page is deleted from the aggregate document (418) and the ordered sequence of the remaining data pages in the aggregate document is updated (420). The deletion threshold value can be a default value or a user-defined value and the data page can be deleted in the same manner as if the data page had been irretrievable. As an example, the baseline signature and the instance signature may be found to be eighty-eight percent (88%) similar. This can indicate that the current instance of data page was edited compared to a previous version of the data page, but the current instance of the data page is substantially similar to the previous instance of the data page. A smaller similarity value, such as, for example, twenty-one percent (21%), can indicate that the current instance of the data page has been substantially changed compared to a previous instance of the data page, possibly making the current instance of the data page unsuitable for use in the aggregate document.

When the aggregate document is a content trail, a data page can have connections leading in to the data page from other data pages and connections leading from the data page to subsequent pages. When the data page is deleted, these connections become broken, which can cause jarring failures in a browsing experience. Therefore, when a page is deleted, those connections leading to and from the data page to be deleted can be re-pointed to new destinations or deleted if no appropriate destination exists. One way this can be achieved is that a single child of a data page to be deleted (e.g., a page to which the data page to be deleted connects) is chosen and the connections that would previously have lead to the data page to be deleted are redirected to lead to the child of the data page to be deleted and vice versa, with child pages leading back to a different data pages instead of to the data page to be deleted.

If the similarity value is greater than the deletion threshold value (416), the similarity value is compared to a bypass threshold value. If the similarity value is less than the bypass threshold value (422), the data page is flagged for bypass and the validation unit bypasses the data page (424). The ordered sequence of the data pages is updated to reflect the bypassing of the data page (426). Bypassing a data page results in the bypassed data page being omitted from the compiled version of the aggregate document. The bypassed data page can be restored or deleted at a later time. The bypass threshold value can be used to determine whether a current instance of a data page is suspicious, but has an associated similarity value that is greater than the deletion threshold value so that deletion is not warranted. For example, if the bypass threshold value is set at sixty percent (60%) and a data page has a similarity value fifty percent (50%), the data page can be flagged for bypass. The data page can still be referenced by the aggregate document, but is not output as part of the aggregate document upon regeneration of the aggregate document so that when the aggregate document is displayed, printed, or otherwise in a distributable or navigable form, the aggregate document does not include the bypassed data page.

When the aggregate document is implemented as a content trail, connections leading to the bypassed page can be updated to point to the next consecutive page or pages beyond bypassed data page, if one exists, so the suspicious data page is not output in the compiled aggregate document. A data page can be bypassed in a similar manner as when a data page is deleted except that the rerouting implemented using the bypass unit can be temporary so that a bypassed data page can be reincorporated into the aggregate document in future compilations of the aggregate document. In this manner, the connections defining the bypassed data page's position in the ordered sequence of data pages are retained, but not used when the data page is bypassed, so that the bypassed data page can be restored in the future if the similarity level later returns to an acceptable level or if a user overrides the bypass setting.

If, however, the calculated similarity value is greater than or equal to the bypass threshold value (422), the data page is included in the aggregate document (428). After the data pages have been processed using the validation unit 100 and the ordered sequence of the data pages has been updated to account for data page deletions and bypassing, a new version of the aggregate document is generated with bypassed and/or deleted data pages either removed or hidden from a user's view. This new aggregate document can be more suitable for use.

Figure 5:
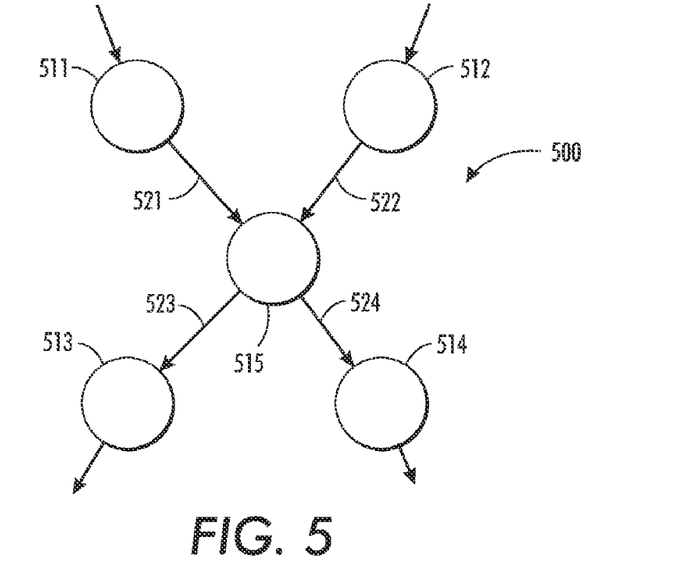
FIGS. 5 and 6 illustrate an exemplary directed flow diagram representing an aggregate document.

FIG. 5 is an exemplary directed graph 500 representing a portion of an aggregate document implemented as a content trail. The content trail can include converging and diverging paths. Nodes 511-515 can represent data pages referenced by the content trail and edges 521-524 can represent the relationship connecting the data pages in a defined ordered sequence of the data pages in the content trail. Each of the data pages represented by the nodes 511-515 can be validated using the validation process implemented by the validation unit. In the present example, the validation unit can determine that nodes 511-514 are retrievable and should be included in the content trail, but that node 515 is either irretrievable or has a similarity value below the deletion and/or bypass threshold value. The validation unit can exclude the data page represented by node 515 from the aggregate document. As a result, the relationships between the data pages are updated to connect the data pages preceding the data page represented by the node 515 to the data pages immediately after the data pages represented by the node 515, as shown in FIG. 6.

Figure 6:
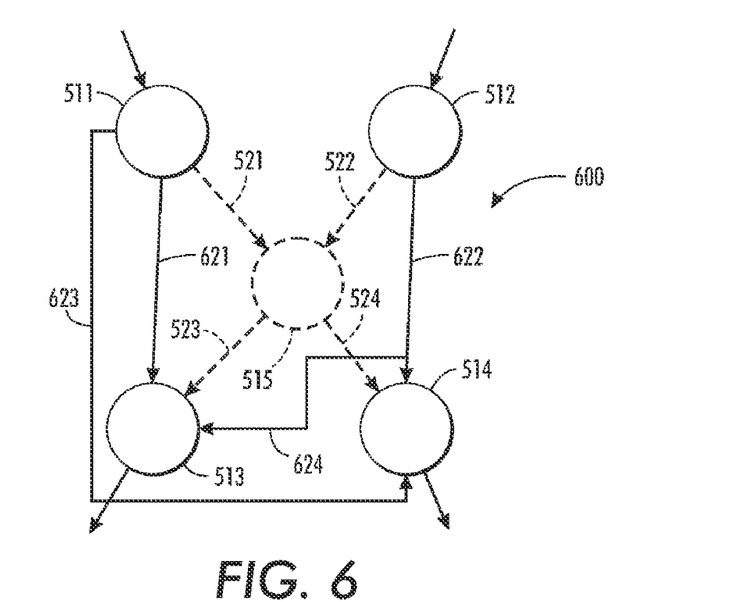

FIG. 6 shows an updated directed graph 600 illustrating the updated ordered sequence of the content trail that results from the omission of the data page represented by the node 515 illustrated in phantom in FIG. 6. As a result of bypassing or deleting the data page represented by node 515, the validation unit generates new relationships between the data pages immediately prior to the bypassed data page and consecutively after the bypassed data page and removes the old relationships represented as nodes 521-524. For example, the validation unit updates the aggregate document so that the data page represented by node 511 connects to the data page represented by node 513, illustrated by edge 621; the data page represented by node 511 connects to the data page represented node 514, illustrated by edge 623; the data page represented by node 512 connects to the data page represented node 514, illustrated by edge 622; and the data page represented by node 512 connects to the data page represented node 513, illustrated by edge 624. The relationships connecting the data pages can be updated in the underlying structure of the aggregate document, which can retain the updated relationships for the next time the aggregate document is compiled or can revert the relationships after the aggregate document is compiled.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for preparing an aggregate document comprising:
    attempting to retrieve data pages of the aggregate document;
    generating an instance signature for a first instance of a data page retrieved for inclusion in the aggregate document;
    comparing the instance signature to a baseline signature associated with a second instance of the data page;
    calculating a similarity value in response to the comparing, the similarity value indicating a degree of similarity between the first instance and the second instance of the data page; and
    determining whether to include, delete or bypass the data page in the aggregate document based on the similarity value.

2. The method of claim 1, wherein generating the instance signature comprises:
    identifying a portion of the data page; and
    creating the instance signature using the portion of the data page.

3. The method of claim 1, wherein comparing the instance signature to the baseline signature comprises:
    identifying common identifiers between the instance signature and the baseline signature, the common identifiers indicating similarities between the instance signature and the baseline signature.

4. The method of claim 1, wherein calculating the similarity value comprises:
    identifying a number of common identifiers between the instance signature and the baseline signature; and
    dividing the number of common identifiers by a total number of identifiers included in the baseline signature.

5. The method of claim 1, wherein determining whether to include, delete or bypass the data page comprises:
    comparing the similarity value to a deletion threshold value; and
    deleting the data page when the similarity value is less than the deletion threshold value.

6. The method of claim 1, wherein determining whether to include, delete or bypass the data page comprises:
    comparing the similarity value to a bypass threshold value; and
    bypassing the data page when the similarity value is less than the bypass threshold value.

7. The method of claim 1, further comprising:
    determining whether the first instance of the data page is retrievable;
    performing one of deletion or bypassing of the data page in the aggregate document when it is determined that the data page is irretrievable; and
    updating an ordered sequence of data pages in the aggregate document upon deletion or bypassing of the data page.

8. A non-transitory computer readable medium storing instructions executable by a computing system including at least one computing device, wherein execution of the instructions implements a method for preparing an aggregate document comprising:
    attempting to retrieve data pages of the aggregate document;
    generating an instance signature for a first instance of a data page retrieved for inclusion in the aggregate document;
    comparing the instance signature to a baseline signature associated with a second instance of the data page;
    calculating a similarity value in response to the comparing, the similarity value indicating a degree of similarity between the first instance and the second instance of the data page; and
    determining whether to include, delete or bypass the data page in the aggregate document based on the similarity value.

9. The medium of claim 8, wherein generating the instance signature comprises:
    identifying a portion of the data page; and
    creating the instance signature using the portion of the data page.

10. The medium of claim 8, wherein comparing the instance signature to the baseline signature comprises:
    identifying common identifiers between the instance signature and the baseline signature, the common identifiers indicating similarities between the instance signature and the baseline signature.

11. The medium of claim 8, wherein calculating the similarity value comprises:
    identifying a number of common identifiers between the instance signature and the baseline signature; and
    dividing the number of common identifiers by a total number of identifiers included in the baseline signature.

12. The medium of claim 8, wherein determining whether to include, delete or bypass the data page comprises:
    comparing the similarity value to a deletion threshold value; and
    deleting the data page when the similarity value is less than the deletion threshold value.

13. The medium of claim 8, wherein determining whether to include, delete or bypass the data page comprises:
    comparing the similarity value to a bypass threshold value; and
    bypassing the data page when the similarity value is less than the bypass threshold value.

14. The medium of claim 8, wherein the method implemented upon execution of the instructions further comprises:
    determining whether the first instance of the data page is retrievable;
    performing one of deletion or bypassing of the data page in the aggregate document when it is determined that the data page is irretrievable; and
    updating an ordered sequence of data pages in the aggregate document upon deletion or bypassing of the data page.

15. A system for preparing an aggregate document comprising:
a computer system including at least one computing device, the computing system configured to:
attempt to retrieve data pages of the aggregate document;
generate an instance signature for a first instance of a data page retrieved for inclusion in the aggregate document;
compare the instance signature to a baseline signature associated with a second instance of the data page;
calculate a similarity value in response to the comparing, the similarity value indicating a degree of similarity between the first instance and the second instance of the data page; and
determine whether to include, delete or bypass the data page in the aggregate document based on the similarity value.

16. The system of claim 15, wherein the computing system is configured to compare the instance signature to the baseline signature by identifying common identifiers between the instance signature and the baseline signature, the common identifiers indicating similarities between the instance signature and the baseline signature.

17. The system of claim 15, wherein the computing system is configured to calculate the similarity value by identifying a number of common identifiers between the instance signature and the baseline signature and dividing the number of common identifiers by a total number of identifiers included in the baseline signature.

18. The system of claim 15, wherein the computing system is configured to determine whether to include, delete or bypass the data page by comparing the similarity value to a deletion threshold value and deleting the data page when the similarity value is less than the deletion threshold value.

19. The system of claim 15, wherein the computing device is configured to determine whether to include, delete or bypass the data page by comparing the similarity value to a bypass threshold value and bypassing the data page when the similarity value is less than the bypass threshold value.

20. The system of claim 1, wherein the computing system is configured to:
determine whether the first instance of the data page is retrievable;
perform one of deletion or bypassing of the data page in the aggregate document when it is determined that the data page is irretrievable; and
update an ordered sequence of data pages in the aggregate document upon deletion or bypassing of the data page.

* * * * *